United States Patent [19]

Calvert et al.

[11] Patent Number: 5,356,205
[45] Date of Patent: Oct. 18, 1994

[54] SEAT ASSEMBLY WITH A DEFINED FLEXURE REGION, VENTING OR SUPPORT NODULES

[75] Inventors: Nathaniel Calvert, Rochester; Michael J. Arbeiter, Minneapolis, both of Minn.

[73] Assignee: InMotion, Inc., Minneapolis, Minn.

[21] Appl. No.: 947,332

[22] Filed: Sep. 18, 1992

[51] Int. Cl.⁵ .................................. A47C 7/02
[52] U.S. Cl. ........................ 297/452.41; 297/180.14; 297/214; 297/197; 297/452.46; 280/288.4
[58] Field of Search ............... 297/180, 195, 458, 159, 297/453, 452, 460, 284.6, 202, 180.1, 180.13, 180.14, 180.15, 195.1, 452.1, 452.21, 452.23, 452.24, 452.26, 452.41, 452.42, 452.46; 5/451, 909; 280/288.4

[56] References Cited

U.S. PATENT DOCUMENTS

| | | | |
|---|---|---|---|
| 574,342 | 12/1896 | Ray | 297/214 |
| 576,969 | 2/1897 | Hunt | 297/214 X |
| 581,464 | 4/1897 | Hollenbeck . | |
| 595,111 | 12/1897 | Perry . | |
| 612,972 | 10/1898 | Leech | 297/201 X |
| 613,927 | 11/1898 | Hunt | 297/214 X |
| 630,911 | 8/1899 | Moore | 297/214 X |
| 1,439,681 | 12/1922 | Alkine et al. | 297/180 X |
| 1,975,405 | 10/1934 | Pryale | 208/15 |
| 1,982,516 | 11/1934 | Holmested | 297/453 X |
| 3,030,145 | 4/1962 | Kottemann | 297/180 |
| 3,756,653 | 9/1973 | Worley | 297/195 |
| 3,807,793 | 4/1974 | Jacobs | 297/214 |
| 3,844,611 | 10/1974 | Young | 297/214 |
| 4,098,537 | 7/1978 | Jacobs | 297/195 |
| 4,109,333 | 8/1978 | Zmiarovich | 5/451 X |
| 4,451,083 | 5/1984 | Marchello | 297/453 X |
| 4,462,171 | 7/1984 | Whispell | 36/3 |
| 4,504,089 | 3/1985 | Calvert et al. | 297/214 |
| 4,726,624 | 2/1988 | Jay | 297/459 |
| 4,751,757 | 6/1988 | Moreno | 5/451 X |
| 4,815,361 | 3/1989 | Chiarella | 297/219 |
| 4,898,422 | 2/1990 | West, III | 297/202 |
| 4,905,331 | 3/1990 | Hochschild, III | 5/451 X |
| 4,945,571 | 8/1990 | Calvert | 2/2 |
| 4,946,220 | 8/1990 | Wyon et al. | 297/180 |
| 4,952,439 | 8/1990 | Hanson | 428/72 |
| 5,020,852 | 6/1991 | Marion | 297/452 X |
| 5,065,465 | 11/1991 | Nystad | 5/451 X |
| 5,086,528 | 2/1992 | Miller | 5/451 |

FOREIGN PATENT DOCUMENTS

| | | | |
|---|---|---|---|
| 3643174 | 6/1988 | Fed. Rep. of Germany | 297/452 |
| 3903303 | 8/1990 | Fed. Rep. of Germany | 297/180 |
| 1081145 | 12/1954 | France | 297/195 |
| 2589119A | 4/1987 | France | 297/195 |
| 0583023 | 12/1977 | U.S.S.R. | 297/195 |
| 0015884 | 7/1896 | United Kingdom | 297/195 |
| 0861994 | 3/1961 | United Kingdom | 297/195 |

Primary Examiner—Kenneth J. Dorner
Assistant Examiner—Milton Nelson, Jr.
Attorney, Agent, or Firm—Westman, Champlin & Kelly

[57] ABSTRACT

A seat assembly having flexure members and ventilation is disclosed. An elongated aperture is cut into a base plate of the seat assembly and flexure members are formed in a support plate of the assembly which is mounted to the base plate. The flexure members deform into the aperture thus providing a rider with additional comfort due to the flexibility of the seat. A venting hole is provided throughout the seat assembly to aid in rider comfort. A forced air ventilation system forces air to flow throughout the seat assembly, thus giving the rider ample ventilation.

18 Claims, 8 Drawing Sheets

# SEAT ASSEMBLY WITH A DEFINED FLEXURE REGION, VENTING OR SUPPORT NODULES

BACKGROUND OF THE INVENTION

The present invention relates to seat assemblies, and in particular, to an improved seat assembly having localized flexibility and ventilation suitable for applications such as improved bicycle seats.

Bicycles and bicycle seats have been known for over one hundred years, and numerous patents have been granted for bicycle seats. Due to the increase in popularity of bicycles for exercise and competitions in recent years, the length of time people spend on bicycle seats has dramatically risen. Bicycle seats with improved comfort for the rider are desired due to the length of time riders are now spending on their bikes exercising, training for competitions, and for pleasure. Lightweight bicycle seats are also desired due to the increased emphasis on competing with bicycles.

Despite the number of patents issued for bicycle seats, a need still exists for further improvements in bicycle seats which provide rider comfort particularly for use on performance bicycles which are ridden for extended periods of time over long distances.

SUMMARY OF THE INVENTION

Embodied as an improved bicycle seat, the assembly has a broader rear saddle portion and a narrower pommel portion. The pommel portion extends generally centrally of and forward from the rear saddle portion. The seat assembly includes a base plate and a support plate.

In a preferred embodiment, the base plate of the bicycle seat is molded out of plastic. In an effort to make the bicycle seat lightweight, thus conducive for racing, a number of holes have been made throughout the base plate to lighten the seat. An elongated aperture is provided in the pommel portion of the base plate to allow deformation of flexure members formed in the support plate. Receiving holes are provided on the base plate to receive mounting plugs, or fastening plugs, from the support plate. A vent hole is also cut into the saddle portion of the base plate and aligns with similar holes in all layers of the seat assembly.

The support plate is substantially the same size and shape as the base plate and is mounted to the base plate. Fastening plugs, which fit into the receiving holes of the base plate, secure the support plate to the base plate. A number of elongated slits are provided in the pommel portion of the support plate and are aligned with the elongated aperture in the base plate. The elongated slits define a flexure region with flexure members that deflect downwardly into the elongated aperture of the base plate when a rider places his or her weight upon the flexure region. A vent hole is cut through the support plate in the saddle portion and aligned with the vent hole of the base plate.

Padding is fastened onto the support plate for additional rider comfort. The padding includes a vent hole in the saddle portion and smaller venting holes in the pommel portion. The venting hole in the saddle portion of the padding is aligned to match up with the venting holes in the base plate and the support plate, and is of the same size and shape. The venting holes in the pommel portion are to allow air that has been forced up through the elongated aperture and the slits of the support plate to continue up to the rider, providing for good ventilation.

Covering the seat assembly is a covering of perforated leather or other breathable material. The cover has a vent hole as found in the base plate, the support plate, and the padding. The covering is made from perforated leather or other breathable material to allow the air that flows up through the elongated aperture of the base plate, the slits of the support plate, and the venting holes of the padding to reach the rider.

A forced air venting system is mounted beneath the seat assembly. The forced air system has an air duct running substantially the length of the seat and is in communication with the elongated aperture of the base plate and the venting hole. A fan is also provided at the rear of the seat assembly and is attached to the air duct. The fan either blows air through the aperture and venting hole or draws air from the aperture and venting hole, thus providing excellent ventilation.

DETAILED DESCRIPTION OF THE PREFERRED EMBODIMENTS

Figure 1:
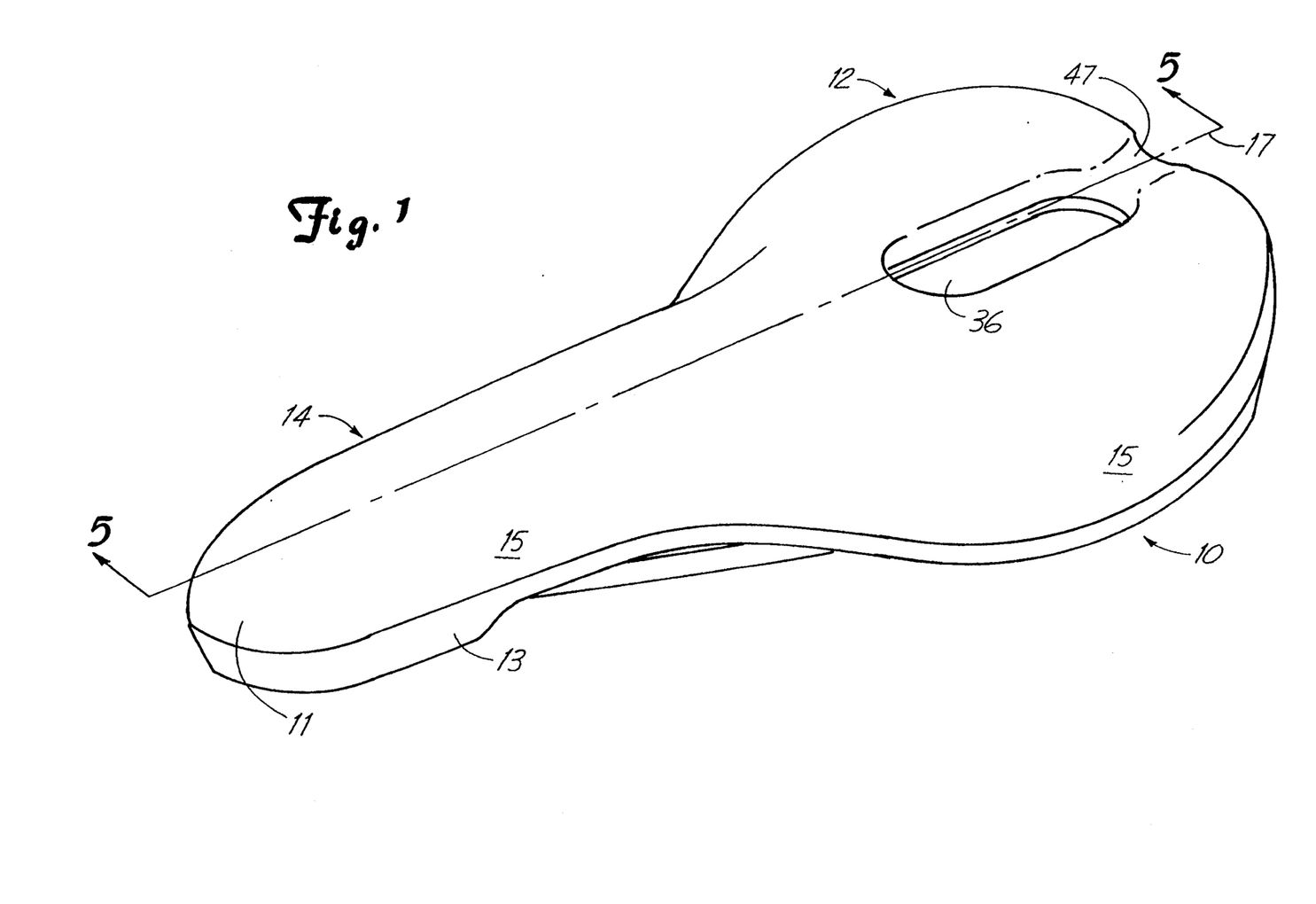
FIG. 1 is a perspective view of a bicycle seat made according to the present invention.

Embodied as a bicycle seat, the present invention is shown generally at 10 in FIG. 1. The seat assembly 10 has a broader rear saddle portion 12 and a narrower pommel portion 14 extending forwardly from the saddle portion 12. The bicycle seat 10 is made in a standard bike seat shape having a raised longitudinal center portion 11 along a longitudinal axis 17 with side surfaces 15 that slope downwardly from the center portion 11 to a perimeter edge 13.

Figure 2:
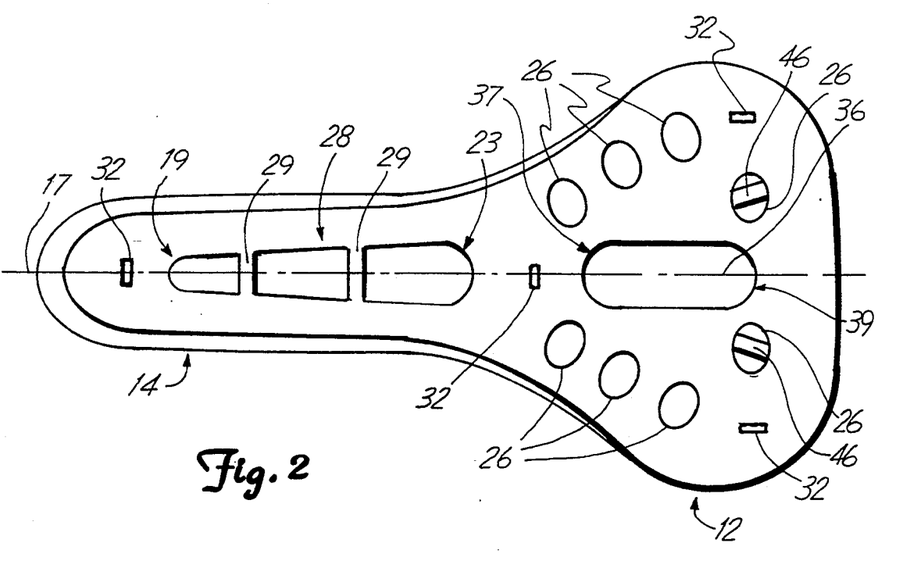
FIG. 2 is a top view of a base plate for the bicycle seat of FIG. 1.

Referring to FIGS. 2-5, the bicycle seat assembly 10 includes a base plate 16, a support plate 18, padding 20, and a cover 22. The base plate 16, as illustrated in FIG. 2, is made from molded styrene or molded plastic. Any other lightweight, sturdy, base material may be used, such as fiberglass or aluminum. Apertures 26 are made in the base plate 16 particularly in the broader saddle portion 12. The apertures 26 are provided in an effort to reduce the overall weight of the bicycle seat assembly 10 by removing unnecessary mass. In addition, the apertures 26 allow the base plate to flex slightly when loaded, while still retaining a substantially stiff support base.

An elongated aperture 28 is cut in the pommel portion 14 of the base plate 16. The aperture 28 runs a substantial length of the pommel portion 14 and has a major axis of elongation generally oriented on the longitudinal axis 17. Preferably, the cross-width opening of the aperture 28 along the major axis of elongation from a front portion 19 to a rear portion 23 generally corresponds to the cross-width of the pommel portion 14. Specifically, the cross-width opening of the front portion 19 is narrower than the cross-width opening of the rear portion 23, wherein the cross-width opening from the front portion 19 to the rear portion 23 increases continuously. At least one cross member, and preferably two cross members 29 strengthen the base plate 16 across the width of the aperture 28. In the embodiment illustrated, the aperture 28 has an overall length of approximately 10 centimeters ("cm") while the cross-width opening of the front portion 19 is approximately 12 millimeters ("mm") and the cross-width opening at the rear portion 23 is approximately 18mm. The aperture 28 provides localized flexure in the pommel portion 14 by allowing a flexure region to downwardly deflect towards the aperture 28. In the embodiment illustrated, flexure members 30, which are formed in the support plate 18 described below, comprise the flexure region.

Figure 3:
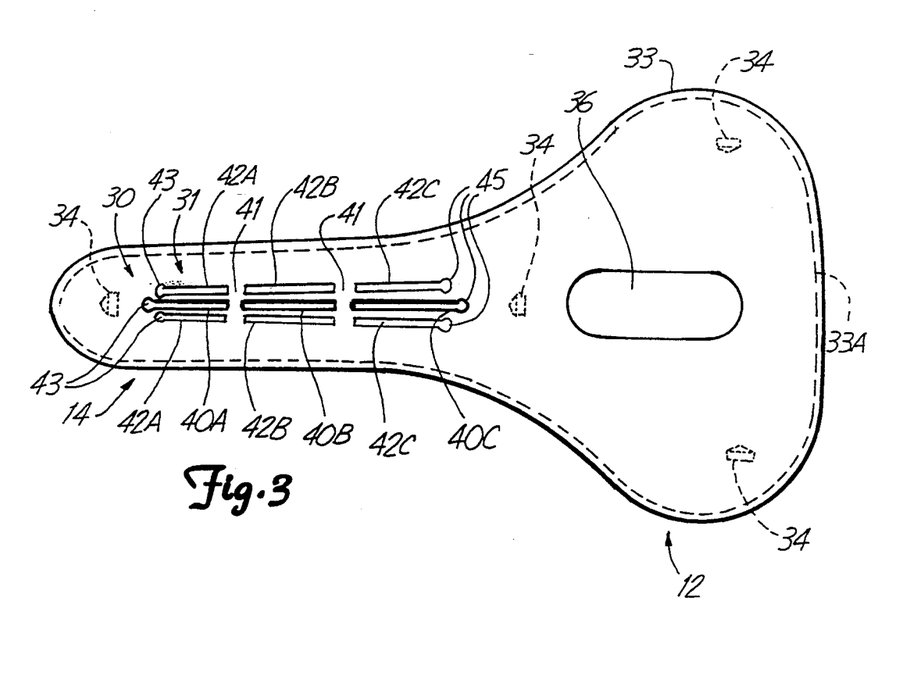
FIG. 3 is a top view of a support plate for the bicycle seat of FIG. 1.

The support plate 18 is mounted upon the top surface of the base plate 16. In the embodiment illustrated, the support plate 18 and the base plate are attached quickly and easily with apertures 32 provided in the base plate 16 that receive mounting plugs 34 which project downwardly from a lower surface 35 of the support plate 18. The support plate 18 has substantially the same shape as the base plate 16 but is slightly larger than the base plate 16 allowing for overlaying mounting to the base plate 16. Preferably, the support plate 18 is made of carbon fiber, but as with the base plate 16, a number of lightweight supporting materials could be used for the support plate 18, such as molded plastic or fiberglass.

As stated above, the flexure members 30 provide localized flexure in the pommel portion 14. The flexure members 30 define the flexure region and are formed in the embodiment illustrated from longitudinal slots 31 formed in the support plate 18. The longitudinal slots 31 comprise a central slot set 40A, 40B and 40C and outer slot sets 42A, 42B and 42C. The central slots 40A-40C run axially along the center of the pommel portion 14 of the support plate 18 generally on the longitudinal axis 17. The longitudinal series length of slots 40A, 40B and 40C is approximately equal to the longitudinal length of aperture 28.

The outer slots 42A-42C are formed adjacent to and on each side of the central slots 40A-40C. Like the aperture 28 described above, the slots 42A-42C generally conform to the change in width of the pommel portion 14 in that the outer slots 42C are slightly farther away from the central slot 40C at an end nearer the saddle portion 12 of the support plate 18 than slots 42A, which are at an end nearer the tip of the pommel portion 14. It should be noted that the ends 43 of the slots 40A and 42A near the front end of the pommel portion 14 have generally circular apertures of diameter slightly larger than the width of each corresponding slot. The larger diameter ends 43 connect to slots 40A and 42A and prevent localized stress flexure of the support plate 18, which could lead to fatigue and eventual cracking. Similar circular apertures 45 are provided on the ends of slots 40C and 42C near the saddle portion 12 to perform the same function.

At least one, and preferably two flexible cross members 41 are provided in the support plate 18. The cross members 41 provide some stability to the support plate 18 in the pommel region 14 while still allowing deflection of the flexure members 30 downwards towards the aperture 28 when the support plate 18 is mounted to the base plate 16. The cross members 41 are positioned in the support plate 18 to generally overlay the cross members 29 of the base plate 16. Preferably, as illustrated, the flexure members 30 and support plate 18 are integral, being formed from a single unitary piece. Circular apertures similar to apertures 43 and 45 could be included at ends of center slots 40B and 42B as well as the inner ends of slots 40A, 42A, 40C and 42C adjacent to cross members 41 if fatigue cracking occurs.

The present design provides flexure without overflex in the pommel region. An overflex condition exists when downward pressure from force applied to the flexing area causes slots 40A-40C to form a valley adjacent to slots 42A-42C and along the longitudinal length of the aperture 28. This overflexing condition causes a subsequent depression in all layers above the aperture 28. As a male or female rider continues to pedal, lateral motion across the seat in the area of the depression causes soreness in the genital area. The seat design reduces the chances of overflexing in the area of flexure. Specifically, the crossmembers 29 and 41 extend across the lateral width of the flexure region and thereby reduce the depth of the longitudinal ridge which may develop when pressure is applied to this area. In addition, by selecting the width of slots 31, which provides a gradual taper in the flexed portion across the lateral width of the aperture 28, the possibility of sharp edges which tend to cause rider discomfort are also reduced.

By securing the support plate 18 to the base plate 16, the flexure members 30 are allowed to deform towards the elongated aperture 28 as the rider applies weight to the pommel portion 14, while added stability is provided to the support plate 18 by the base plate 16. The added stability provided by the base plate 16 tends to restrain the support plate 18 from deforming or expanding outwardly in a direction generally perpendicular to a plane including the longitudinal axis 17 and bisecting the seat assembly 10. Since the support plate 16 tends not to expand outwardly, the side surfaces 15 of the seat assembly also tend not to expand outwardly, thereby retaining the preferred saddle or seat shape and reducing outward pressure on the rider's thighs. This outward pressure, if not restricted, causes chaffing or abrasion of the inner thigh as the rider sits and pedals. By cutting longitudinal slots 40A-40C and 42A-42C into the support plate 18, the support plate 18 loses some of its rigidity, and is thus more compliant to downward forces on the upper surface of the pommel portion 14. Specifically, when a rider puts pressure on the support plate 18 in the region of the flexure members 30, deformation will occur. The flexure members 30 will generally deform towards the aperture 28. If the rider's weight is sufficient, a portion of the flexure members 30 will enter the aperture 28. By mounting the support plate 18 to the base plate 16, the tendency of the support plate 18 to flatten out with side surfaces 15 projecting outwardly is reduced.

Figure 4:
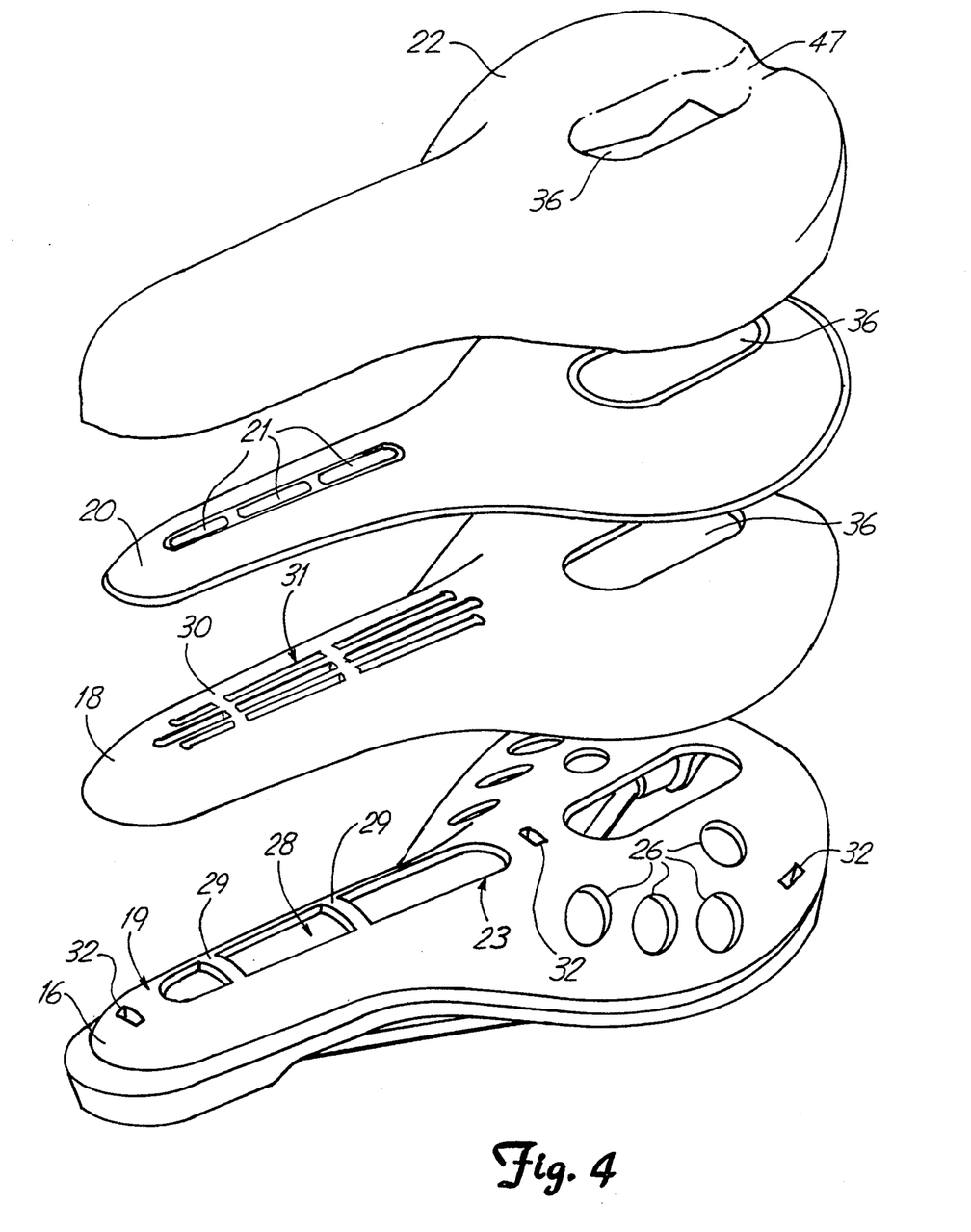
FIG. 4 is a partially exploded perspective view of the bicycle seat of FIG. 1.
Figure 5:
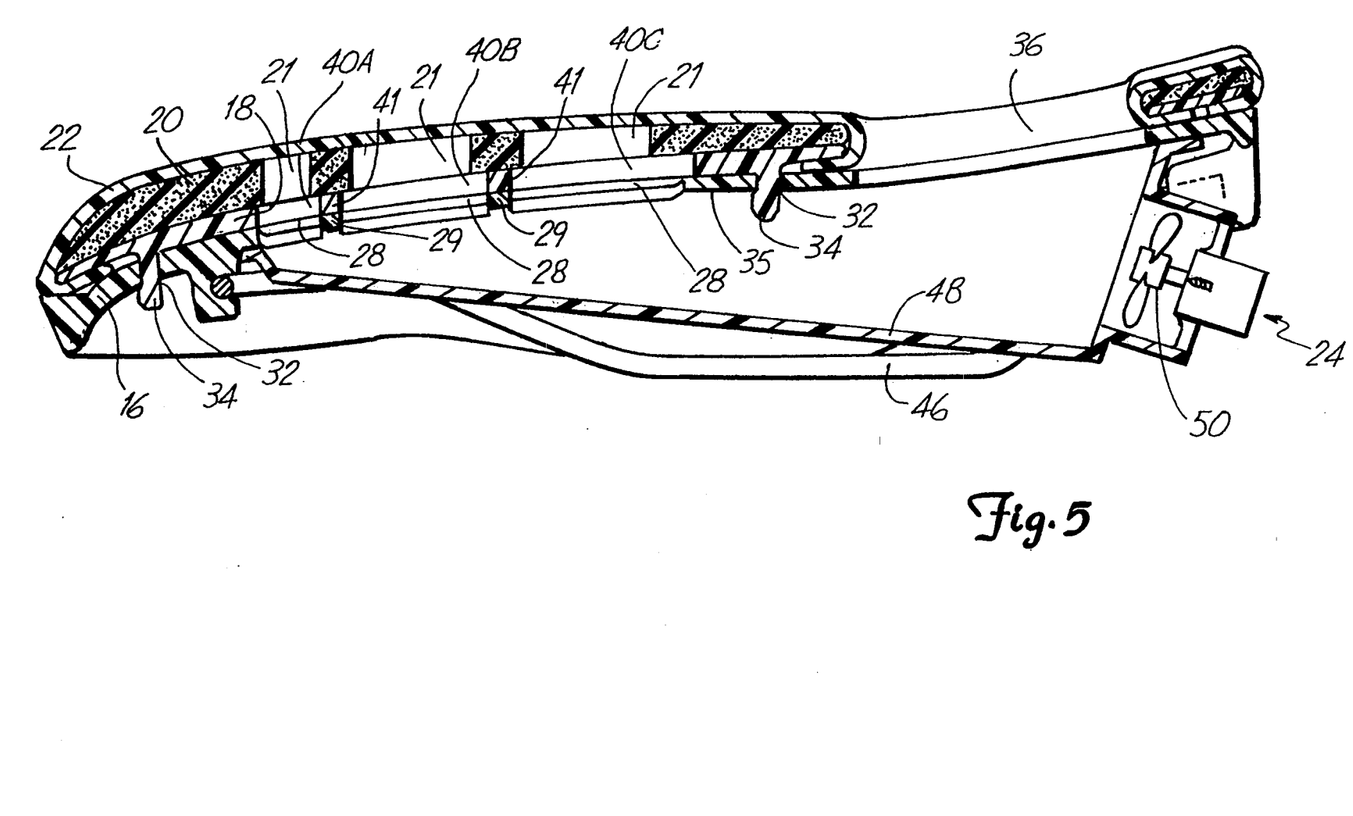
FIG. 5 is a sectional view taken along line 5—5 of FIG. 1.

To further improve comfort for the rider, padding 20 is affixed to the support plate 18 in a conventional manner. The padding 20 is the same shape and size as the support plate 18 and in the preferred embodiment is made of molded polyurethane foam, but any commonly known padding material may be used.

A cover 22 covers the padding 20 and the support plate 18. The cover 22 wraps around a perimeter edge 33 of the support plate 18 and is secured to the lower surface 35 thereof. In the embodiment shown, a foam edging is adhered to the lower surface 35 along the perimeter edge 33. The foam edging extends inward from the perimeter edge 33 to a hidden line 33A. The foam edging provides a cushion for the cover 22 when the support plate 18 is mounted to the base plate 16 with edge portions of the cover 22 sandwiched therebetween. The cover 22 is held in place in a manner known to those skilled in the art of bicycle seats, for example, with glue and/or staples. Preferably, the cover 22 is made of perforated leather or Lycra ® brand spandex fibers manufactured by E. I. DuPont de Nemours & Co., Inc., but any other material suitable for bicycle seat covers would suffice.

Figure 6:
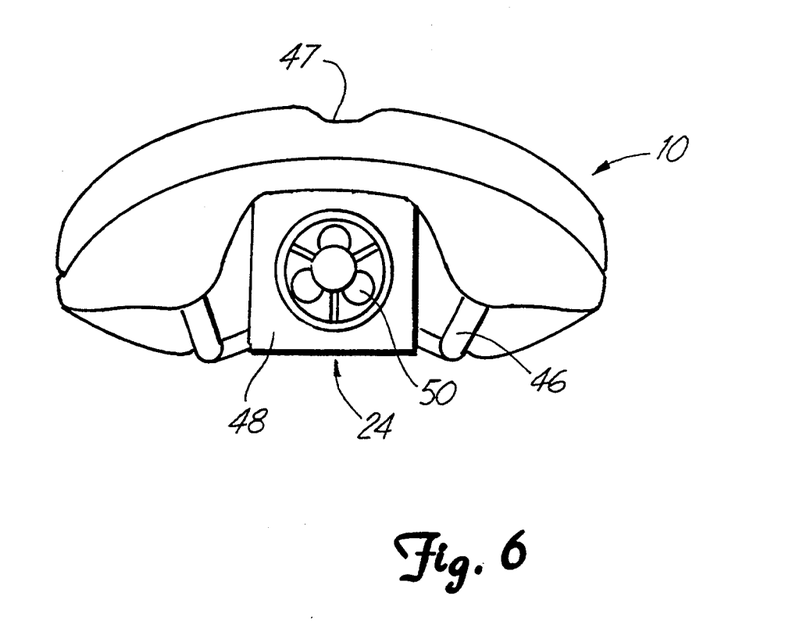
FIG. 6 is a rear perspective view of the bicycle seat.

In a preferred embodiment, the seat assembly 10 includes a ventilation system 24 comprising at least one ventilation hole extending from an upper surface of the seat assembly that contacts the rider to a lower surface of the base plate 16. Referring to FIG. 5, a venting hole 36 is provided in the saddle portion 12. The venting hole 36 is cut out of the base plate 16 in the saddle portion 12 to give the rider ample air flow. The venting hole 36 proceeds through the base plate 16, up through the support plate 18, through the padding 20, and also through the cover 22. The venting hole 36 is elongated and oriented such that a major axis of elongation is on the longitudinal axis 17. In the embodiment illustrated, the venting hole 36 is approximately 22 millimeters wide and approximately 60 millimeters long. As best illustrated in FIGS. 4 and 6, a depression 47 is formed between the rear edge of the venting hole 36 extending to the rear perimeter edge 13 along the longitudinal axis 17. The depression 47 provides a path or channel for air to flow from the vent hole 36 when the rider sits on the seat assembly 10. The venting hole 36 and the depression 47 are gently tapered inward as opposed to sharply edged. Tapering reduces abrasion upon the tissue of the buttocks as the rider pedals, thus improving comfort.

Figure 7:
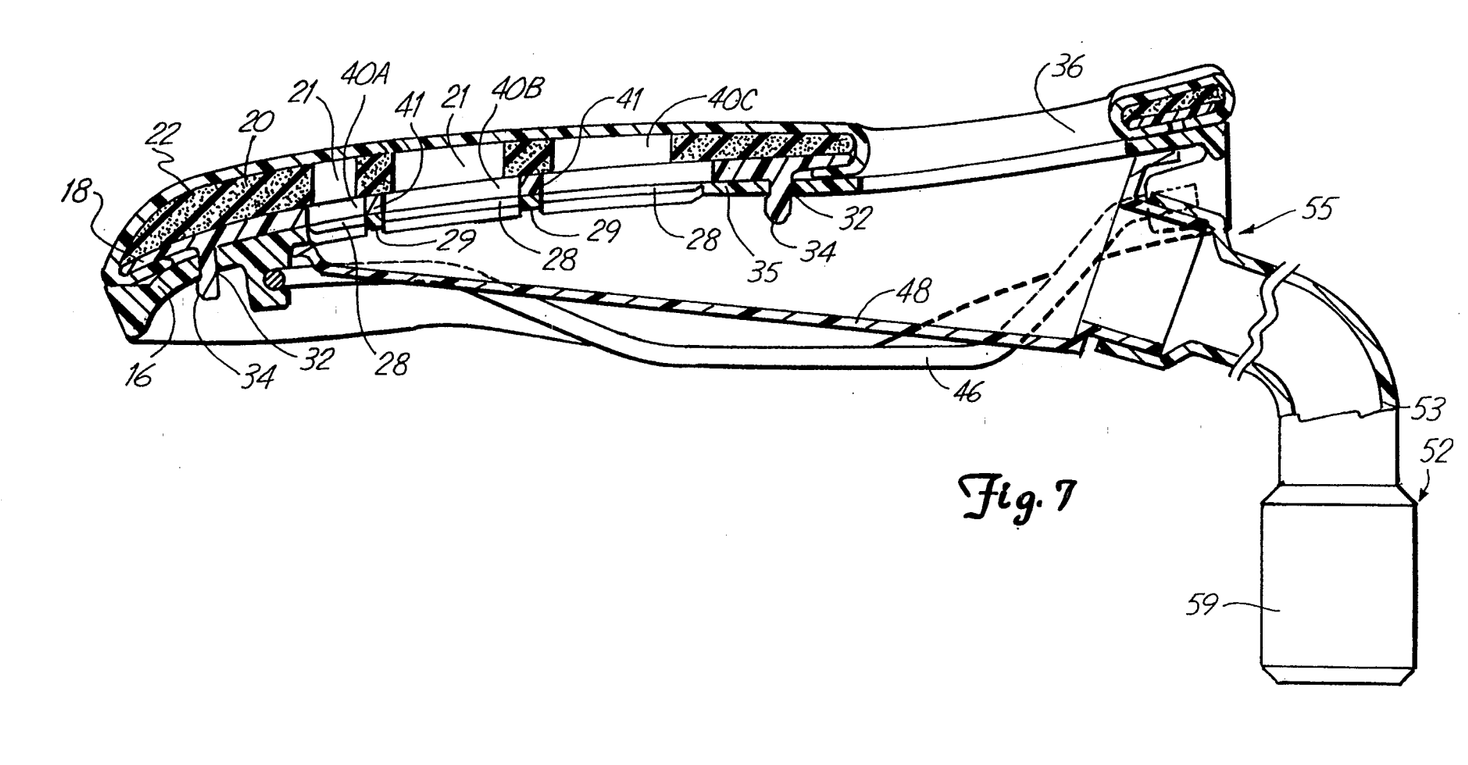
FIG. 7 is a sectional view of an alternative preferred embodiment.

In a further preferred embodiment of the ventilation system 24, means are provided for forcing air through the venting hole 36. Referring to FIG. 5, the ventilation system 24 further includes an air duct 48 positioned between conventional support rods 46. The support rods 46 are fixed to the bottom side of the seat assembly 10 and are used to mount the seat assembly 10 in a conventional manner to a bicycle seat post, not shown. The air duct is in communication with the venting hole 36. The air duct 48 is formed by a three-sided molded plastic enclosure, as illustrated in FIGS. 5, 6, and 7, which is formed inside the support rods 46. A fan 50 is located at the rear of the saddle portion 12 of the seat assembly 10 and is connected to the air duct 48. The fan 50 either forces air in or draws air out of the air duct 48, thus either forcing air up through the venting hole 36, or else drawing air therefrom. The fan 50 may be powered by batteries or may be powered by the rider by means of a generator common to bicycles, or any other standard way of powering a fan.

Alternatively, air can be forced through the air duct 48 from means, such as a fan, remotely located away from the seat assembly 10. Referring to FIG. 7, an air passageway 53 is connected at a first end 55 to the air duct 48. At a second end 52, the air passageway 53 connects to a fan 59 or similar device that forces air movement through the air passageway 53 and air duct 48. As stated above, the fan 59 can be conventionally powered from batteries or a generator mounted to the bicycle.

Figure 10:
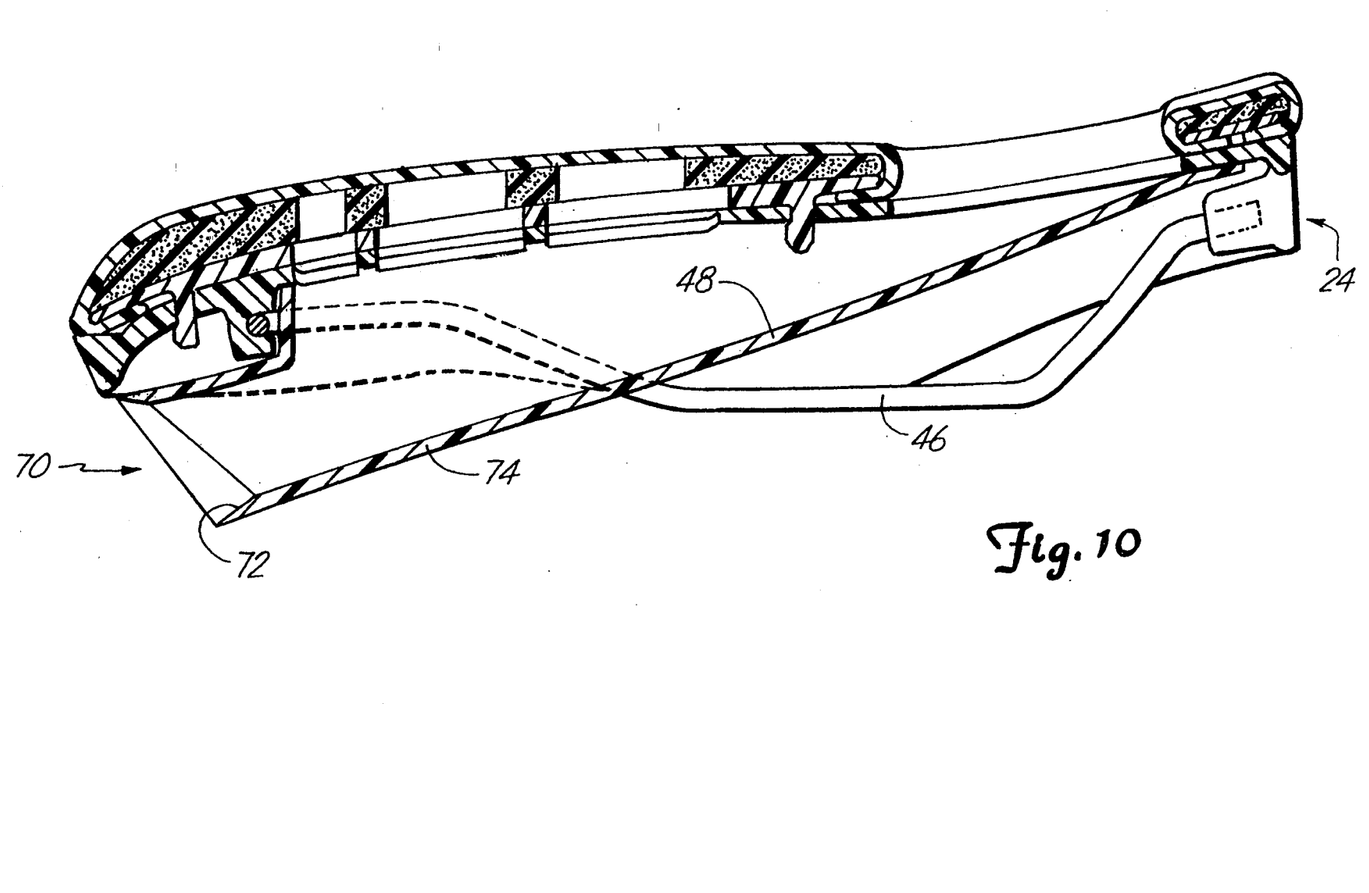
FIG. 10 is a sectional view of an alternative ventilation system.

An alternative way to generate air flow in the air duct 48 is to use means to deflect or catch air as the bicycle is in motion and thus force into the air duct 48. FIG. 10 illustrates an embodiment of an air deflection means 70. The air deflection means 70 includes a downwardly extending air funnel or scoop 74 having an aperture 72. The aperture 72 receives the air as the bicycle and seat assembly 10 are moved, forcing the captured air into the air duct 48. Of course, the air funnel 74 is designed not to interfere with pedal motion, while the size of the aperture 72 is easily selected based on the desired amount of air flow through the air duct 48 at a given rate of bicycle speed. In an alternative embodiment, an air funnel may replace the fan 59 and be attached to the remote end 52 of the flexible tubing 53 of FIG. 7. The funnel may then be positioned below the pommel portion 14 of the seat assembly 10 to catch air when the bicycle is in motion, or any other place desired to catch air to create the forced air system.

In a further preferred embodiment, the ventilation system 24 includes means for providing air flow through the seat assembly 10 in the pommel portion 14. As illustrated in FIG. 5, the air duct 48 extends forwardly beneath the pommel portion 14 beyond a front edge of the aperture 28. As stated above, the set of slots 31 in the support plate 18 generally align with the aperture 28 in the base plate 16. Suitable apertures 21 in the padding 20 communicate with the set of slots 31 and the aperture 28 of the support plate 18 and the base plate 16, respectively, and allow air flow between the top surface of the breathable cover 22 and the air duct 48. Alternatively, suitable apertures can be provided in the cover 22 to communicate with the apertures 21 in the padding 20. If apertures are provided in the cover, they should be rounded gently inward without sharp edges to prevent rider discomfort as described above.

It should be understood that the flexure region could also be formed in a manner other than with the slots 31 herein depicted. In addition, the flexure region can be formed with a suitable flexible material that will resist some downward pressure. If ventilation is further desired, the flexible material would then allow air to pass therethrough.

Figure 8:
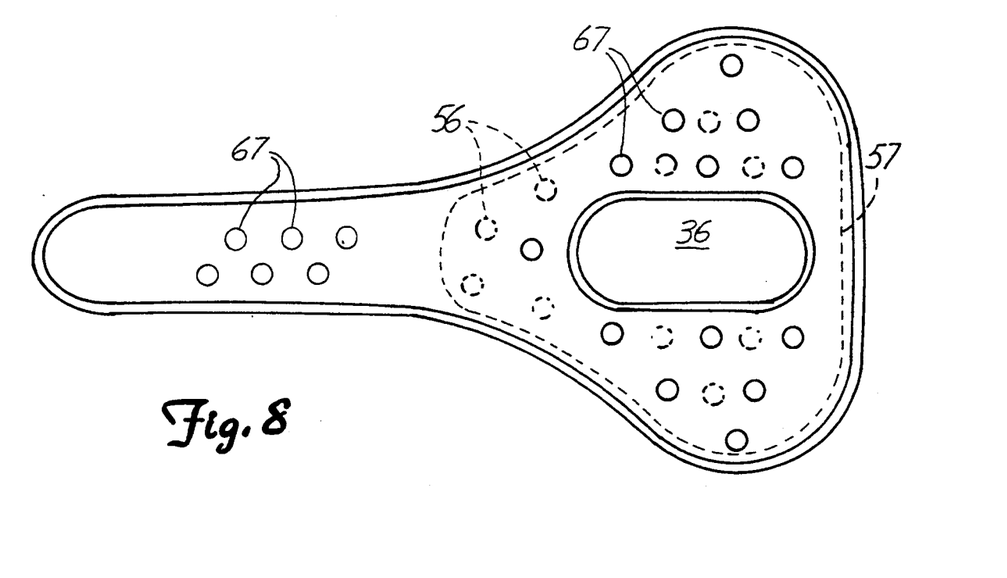
FIG. 8 is a top view of a liquid filled padding utilized in an alternative embodiment of the present invention.
Figure 9A:
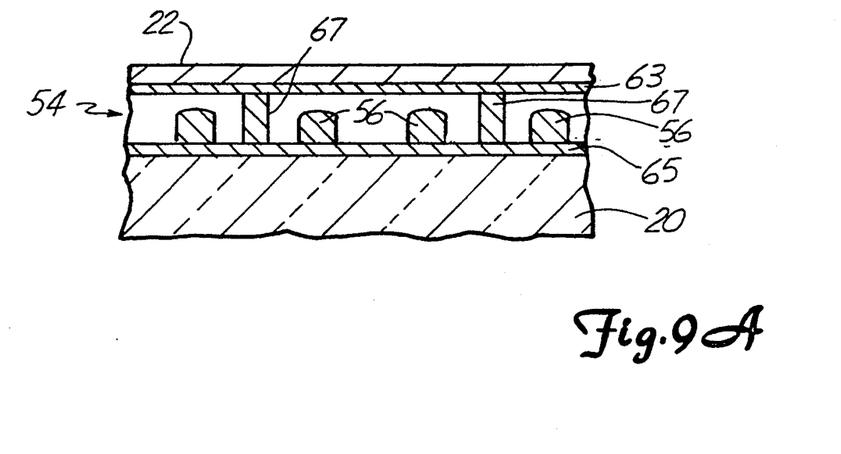
FIGS. 9A, 9B and 9C are sectional views of alternative embodiments of the liquid-filled bladder.

In order to further provide comfort to the rider, the seat assembly 10 may include a liquid-filled bladder illustrated in FIG. 8. The liquid-filled bladder 54 is similar to the liquid-filled bladder described in detail in the Assignee's prior U.S. Pat. No. 4,945,571, which is herein incorporated by reference. Referring also to FIG. 9A, the liquid-filled bladder 54 includes an upper layer 63 that is sealed in conventional manner to a lower layer 65. A free flowing liquid having relatively low viscosity is sealed between the upper layer 63 and the lower layer 65. Preferably, the liquid-filled bladder includes connectors 67 whereat the upper layer 63 is joined to the lower layer 65. The connectors 67 act as barriers to the liquid, and thus, create endless, surrounding channels. As the rider's weight is supported by the bladder 54, the liquid is distributed about the channelways to other areas of the bladder and thereby provides a dynamic support action with a continual redistribution of the liquid throughout the bladder 54. As taught in U.S. Pat. No. 4,945,571, voids joining the upper layer 63 with the lower layer 65 can be used in place of the connectors 67.

Also added to the liquid-filled bladder 54 of the present invention for rider comfort are a plurality of domed-shaped nodules 56. The nodules 56 provide added comfort because support pressure from the seat assembly is substantially increased at selected pressure points upon the rider. In contrast, with standard padding, the seats of the prior art support the rider over relatively large areas on the rider's posterior at substantially constant pressure. The constant pressure over a relatively large area in turn restricts blood flow throughout the rider's posterior, which causes numbness and discomfort. With the nodules 56, pressure is substantially increased in localized areas by the nodules upon the rider's posterior, which in turn allows blood to flow easily in areas surrounding the nodules 56 where contact pressure is less. The nodules 56 are dome shaped, because as previously mentioned, sharp edges cause rider discomfort.

The nodules 56 may be placed relative to the liquid-filled bladder 54 in a number of different ways. For example, as illustrated in FIG. 9A, the nodules 56 may be positioned within the liquid-filled bladder 54 attached or secured to the lower layer 65. As shown, the liquid-filled bladder 54 is positioned between the padding 20 and the cover 22. If desired, the liquid-filled bladder 54 may replace the padding 20.

Figure 9B:
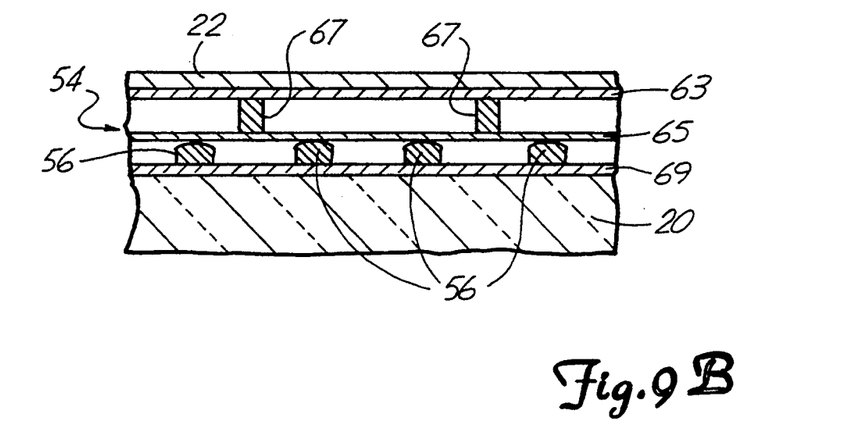

As illustrated in FIG. 9B, the nodules 56 can also be positioned outside the sealed liquid in the liquid-filled bladder 54. In this embodiment, the liquid-filled bladder includes a third layer 69. The nodules 56 are secured to the third layer 69 and contact the lower layer 65. Again, the nodules 56 localize pressure contact upon the rider's posterior to aid in the free flow of blood. It should be noted that the connectors 67 are preferably compliant and offer little support to the rider. As stated above, the connectors 67 can be replaced with voids where the upper layer 63 is sealed directly to the lower layer 65.

Another mounting position, not shown, for the nodules relative to the liquid-filled bladder include location of the nodules between the cover 22 and the upper layer 63. It should be equally understood that the nodules 56 can be secured to the upper layer 63, or any intermediate layer, to project downwardly away from the rider's posterior.

Figure 9C:
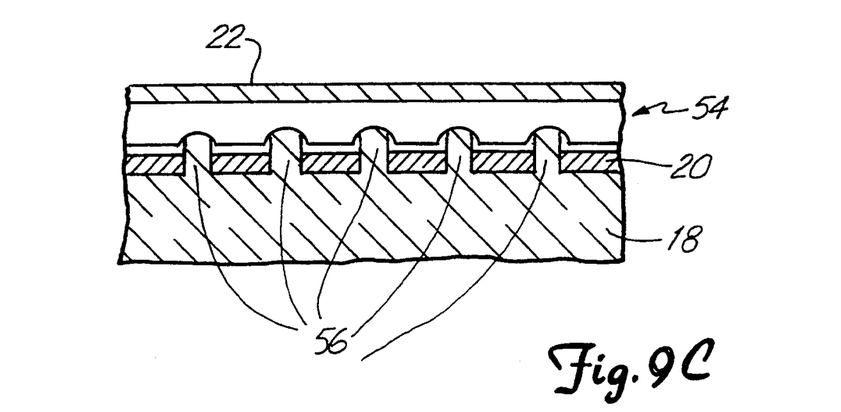

A preferred placement of the nodules 56 is to have them formed in the support plate 18. In this embodiment, the padding 20, positioned between the support plate 18 and the liquid-filled bladder 54, has holes which align with the nodules 56. The liquid-filled bladder 54 is positioned on top of the padding 20, as illustrated in FIG. 9C. In this embodiment, the nodules 56 help align the padding 20 with the support plate 18 while providing the localized pressure previously described.

In any of the above described embodiments, the nodules 56 are scattered across the saddle portion 12 in a nodular area 57 as illustrated in FIG. 8.

The liquid-filled bladder 54 includes apertures sufficient to communicate with apertures located in the base plate 16, the support plate 18, the cover 22 and the padding 20, if used, to allow air to flow therethrough. Specifically, the liquid-filled bladder 54 has an aperture 71 that generally aligns with the venting hole 36. In addition, if pommel ventilation is desired, the liquid-filled bladder 54 can include smaller venting holes, or venting slots, as illustrated.

Although the present invention has been described with reference to a bicycle seat, use of localized flexing having the structure herein described, a forced ventilation system for apertures provided in the seat assembly, and use of nodules with a liquid-filled bladder can be incorporated in other types of seats, such as but not limited to exercisers, motorcycle seats, car seats, wheelchairs, horse saddles and chairs. In addition, workers skilled in the art will recognize that changes may be made in form and detail without departing from the spirit and scope of the invention.

What is claimed is:

1. A seat assembly comprising:
   a support plate;
   a liquid-filled bladder mounted to the support plate;
   a plurality of nodules engaging the liquid-filled bladder, the nodules increasing pressure at localized pressure points upon a person when the person applies weight to the seat assembly, wherein the nodules are formed on the support plate; and
   a foam padding having apertures substantially aligned with the nodules, the nodules passing through the apertures thereby aligning and retaining the padding in position.

2. The seat assembly as in claim 1 wherein the support plate has a flexure region, the flexure region comprising slots formed in the support plate that form flexure members which deflect downwardly when a force is applied to the flexure region.

3. The seat assembly as in claim 2 wherein the seat assembly has a saddle portion and a pommel portion extending generally centrally of and forward from the saddle portion wherein the saddle portion is broader than the pommel portion, and wherein and the flexure region is disposed in the pommel portion.

4. The seat assembly as in claim 3 wherein each slot has a first open end and a second open end, and wherein the first open ends are located closer together than the second open ends, and wherein the first open ends are located farther away from the saddle portion than each corresponding second open end.

5. The seat assembly as in claim 4 wherein the slots comprise a first set of slots and a second set of slots. Each set of slots forming corresponding flexure members, and wherein the flexure region further comprises a crossmember joining each of the flexure members together and to a portion of the support plate adjacent the flexure region.

6. The seat assembly as in claim 5 and further comprising a base plate mounted to the support plate.

7. The seat assembly as in claim 6 wherein the base elate includes an aperture located below the flexure members, the flexure members deflecting downwardly towards the aperture when a force is applied to the flexure region, and wherein the flexure members enter the aperture if a sufficient force is applied.

8. The assembly as in claim 7 and venting means for allowing air to flow between a lower surface of the base plate and an upper surface of the support plate, the venting means comprising a venting hole through the base plate and the support plate.

9. The assembly as in claim 5 wherein the venting hole is disposed in the saddle portion.

10. The assembly as in claim 5 wherein the venting means includes fan means for forcing air through the venting hole.

11. The assembly as in claim 8 wherein the venting means includes an air duct connected to the base plate, the air duct being continuously open while controlling air flow through the venting hole.

12. The assembly as in claim 11 and deflection means connected to the air duct for deflecting air into the air duct when the seat assembly is displaced relative to the air.

13. The assembly as in claim 11 and further comprising fan means connected to the air duct for forcing air through the air duct.

14. The assembly as in claim 7 wherein the air duct further controls air flow through the aperture.

15. A saddle seat assembly having a saddle portion and a pommel portion extending generally centrally of and forward from the saddle portions, wherein the saddle portion is broader than the pommel portion, the saddle seat assembly comprising:
   a base plate having an elongated aperture in the pommel portion of the base plate and a first venting hole;
   a support plate mounted to the base plate having a flexure region, the flexure region comprising slots formed in the pommel portion of the support plate that form flexure members which are disposed adjacently above the aperture and deflect downwardly toward the elongated aperture when a force is applied to the flexure region, and a second venting hole substantially aligned with the first venting hole;
   padding means fastened to the support plate having a third venting hole substantially aligned with the second venting hole; and
   forced air means for forcing air to flow through the first venting hole, the second venting hole and the third venting hole.

16. The saddle seat assembly as in claim 15 wherein the forced air means comprises an air duct in communication with the first venting hole and the elongated aperture of the base plate, the forced air means further forcing air to flow through the elongated aperture.

17. The saddle seat assembly as in claim 16 wherein the padding means further includes a liquid-filled padding system wherein the liquid-filled padding system includes a fourth venting hole in the liquid-filled padding system which substantially aligns with the first venting hole of the base plate, and means for providing pressure at localized pressure points.

18. The saddle seat assembly as in claim 17 wherein the means for providing pressure at localized pressure points are nodules.

* * * * *

UNITED STATES PATENT AND TRADEMARK OFFICE
CERTIFICATE OF CORRECTION

PATENT NO. : 5,356,205
DATED : October 18, 1994
INVENTOR(S) : Calvert et al.

It is certified that error appears in the above-indentified patent and that said Letters Patent is hereby corrected as shown below:

Column 8, lines 39 and 40, delete ". Each" and insert --, each--.

Column 8, line 48, delete "elate" and insert --plate--.

Column 9, line 11, delete "portions" and insert --portion--.

Signed and Sealed this

Fourteenth Day of February, 1995

Attest:

BRUCE LEHMAN

*Attesting Officer*     *Commissioner of Patents and Trademarks*